United States Patent
Ueki et al.

[11] Patent Number: 5,349,027
[45] Date of Patent: Sep. 20, 1994

[54] MODIFIED POLYOLEFIN RESIN COMPOSITIONS

[75] Inventors: Toru Ueki; Masaji Yoshimura; Kazuharu Kanezaki, all of Kanagawa; Susumu Kishi, Chiba; Takashi Satoh; Minoru Takiguchi, both of Kanagawa, all of Japan

[73] Assignee: Mitsui Toatsu Chemicals, Inc., Tokyo, Japan

[21] Appl. No.: 927,530

[22] PCT Filed: Mar. 27, 1991

[86] PCT No.: PCT/JP91/00393

§ 371 Date: Sep. 16, 1992

§ 102(e) Date: Sep. 16, 1992

[87] PCT Pub. No.: WO91/14717

PCT Pub. Date: Oct. 3, 1991

[30] Foreign Application Priority Data

| Mar. 28, 1990 | [JP] | Japan | 2-76580 |
| Mar. 28, 1990 | [JP] | Japan | 2-76581 |
| Jun. 25, 1990 | [JP] | Japan | 2-164037 |
| Aug. 7, 1990 | [JP] | Japan | 2-207515 |

[51] Int. Cl.$^5$ .................................... C08F 236/10
[52] U.S. Cl. .................... 525/331.7; 525/329.4; 525/329.9; 525/330.3; 525/374; 525/383; 525/404
[58] Field of Search ............ 525/331.7, 329.4, 329.9, 525/330.3, 374, 383, 440

[56] References Cited

FOREIGN PATENT DOCUMENTS

| 146130 | 6/1985 | European Pat. Off. |
| 317358 | 5/1989 | European Pat. Off. |
| 1326931 | 6/1962 | France. |
| 58-53935 | 3/1983 | Japan. |
| 59-62613 | 4/1984 | Japan. |
| 62-129343 | 6/1987 | Japan. |
| 62-129345 | 6/1987 | Japan. |

OTHER PUBLICATIONS

Patent Abstracts of Japan, vol. 13, No. 21 (C-560)(3369), Jan. 18, 1989.
Patent Abstracts of Japan, vol. 12, No. 248 (C-511, (3095), Jul. 13, 1988.

*Primary Examiner*—John C. Bleutge
*Assistant Examiner*—Randy Gulakowski
*Attorney, Agent, or Firm*—Burns, Doane, Swecker & Mathis

[57] ABSTRACT

A modified polyolefin resin obtained by reacting a polyolefin resin with an epoxy group-containing acrylamide monomer represented by the following general formula I:

$$H_2C=CR-CO-NH-CH_2-Ar:$$

wherein Ar represents an aromatic hydrocarbon group having 6 to 24 carbon atoms which is substituted with at least one glycidyloxy group and R represents a hydrogen atom or a methyl group) in the presence of a free-radical initiator is herein provided.

A thermoplastic resin composition comprising 5 to 95% by weight of the foregoing modified polyolefin resin and 95 to 5% by weight of another thermoplastic resin is herein provided.

Further, a filler-reinforced polyolefin resin composition comprising 100 parts by weight of the foregoing modified polyolefin resin and 3 to 300 parts by weight of an inorganic or organic filler is herein provided.

12 Claims, No Drawings

MODIFIED POLYOLEFIN RESIN COMPOSITIONS

TECHNICAL FIELD

The present invention relates to a modified polyolefin resin composition which does not give out a bad smell during modification and which has excellent adhesion to fillers, metals and polymeric resin substrates as well as a thermoplastic resin composition comprising the modified polyolefin resin and a thermoplastic resin and having good mechanical properties.

BACKGROUND OF PRIOR ART

In general, polyolefin resins have excellent physical and chemical properties and have widely been used as materials for molding into, for instance, fibers and films. Moreover, they are reinforced with fillers such as glass fibers for making the best use of these characteristics. However, polyolefins have low adhesion to glass fibers and thus it is not possible to sufficiently enjoy reinforcing effects of fillers, because they are free of reactive functional groups. To eliminate these disadvantage, there have been proposed the use of so-called modified polyolefin resins such as those obtained through copolymerization of olefins with modifying agents, for instance, unsaturated carboxylic acids or epoxy group-containing vinyl monomers such as glycidyl methacrylate (hereinafter referred to as "GMA") or allyl glycidyl ether, or grafting polyolefin resin with the modifying agents (see, for instance, Japanese Unexamined Patent Publication (hereinafter referred to as "J. P. KOKAI") No. Sho 59-62613).

According to these methods, strong chemical bonds are formed between carboxyl groups or epoxy groups and glass fibers and thus the glass fibers are firmly adhered to the modified polyolefin resin. More specifically, the reinforcing effect by glass fibers is improved in systems which these modified polyolefin resins are used. However, the modification with unsaturated carboxylic acids possibly becomes a cause of corrosion of metallic parts such as screws of an extruder during the preparation of fiber-reinforced resins. In addition, the epoxy group-containing vinyl monomers, in general, have a low boiling points often give out a bad smell during extrusion at a high temperature and thus have bad workability.

Moreover, it has been investigated to blend polyolefin resins with other resins such as polyester resins, polyphenylene sulfide resins, polycarbonate resins and polyamide resins since they are excellent in impact resistance and resisance to chemicals and are not expensive. However, the polyolefin resin in itself has low compatibility with the foregoing resins. Accordingly, the resulting blend shows substantial reduction of such properties as Izod impact strength, tensile strength and elongation and is not impracticable.

DISCLOSURE OF THE INVENTION

An object of the present invention is to provide a modified polyolefin resin composition which does not give out a bad smell during modification and which has excellent adhesion to fillers, metals and substrates of synthetic resins.

Another object of the present invention is to provide a thermoplastic resin composition comprising a modified polyolefin resin and other thermoplastic resins and having good mechanical properties such as Izod impact strength, tensile strength and elongation.

A still another object of the present invention is to provide a modified polyolefin resin composition which is reinforced with fillers.

According to the present invention, there is provided a modified polyolefin resin obtained by reacting a polyolefin resin with an epoxy group-containing acrylamide monomer represented by the following general formula I:

$$H_2C=CR-CO-NH-CH_2-Ar \qquad (I)$$

wherein Ar represents an aromatic hydrocarbon group having 6 to 24 carbon atoms which is substituted with at least one glycidyloxy group and R represents a hydrogen atom or a methyl group.

The foregoing polyolefin resin is obtained by a method which comprises reacting the epoxy group-containing acrylamide monomer represented by the above general formula I with a polyolefin resin in the presence of a free-radical initiator.

According to another aspect of the present invention, there is provided a thermoplastic resin composition which comprises 5 to 95% by weight of the foregoing modified polyolefin resin and 95 to 5% by weight of another thermoplastic resin.

According to a still another aspect of the present invention, there is provided a filler-reinforced polyolefin resin composition which comprises 100 parts by weight of the foregoing modified polyolefin resin and 3 to 300 parts by weight of an inorganic or organic filler.

BEST MODE FOR CARRYING OUT THE INVENTION

Examples of the polyolefin resins usable in the present invention include polypropylene, polyethylene, propylene-ethylene block or random copolymers, ethylene-propylene elastomer, ethylene-propylene-diene elastomer, ethylene-propylene-dicyclopentadiene copolymer, ethylene-propylene ethylidene norbornene copolymer and poly(4-methyl-pentene-1). The foregoing resins may be used in combination.

The epoxy group-containing acrylamide monomer represented by the foregoing general formula I used as the modifying agent in the present invention can easily be prepared by condensing an aromatic hydrocarbon carrying at least one phenolic hydroxyl group with N-methylolacrylamide or N-methylolmethacrylamide, or an alkyl ether derivative of N-methylolacrylamide or N-methylolmethacrylamide in the presence of an acid catalyst and then converting the phenolic hydroxyl groups into glycidyl groups. Specific examples of the epoxy group-containing acrylamide monomer include N-[4-(2,3-epoxypropoxy)-3,5-dimethylbenzyl] acrylamide, N-[4-(2,3-epoxypropoxy)-3,5-dimethylbenzyl] methacrylamide and N-[4-(2,3-epoxypropoxy)-3-methylbenzyl] acrylamide.

The free-radical initiator usable in the invention may be any conventionally known ones and specific examples thereof are organic peroxy compounds represented by t-butylperoxy benzoate, dicumyl peroxide, 2,5-dimethyl-2,5-di(t-butylperoxy)hexane, di-t-butyl-peroxide and 2,5-dimethyl-2,5-di(t-butylperoxy)hexene-3; azobisnitrile compounds represented by azo bisisobutyronitrile and azobisisovalelonitrile; or organic peroxy compounds represented by benzoin peroxide.

The preparation of the modified polyolefin resin is carried out using 0.01 to 20 parts by weight, preferably 0.1 to 10 parts by weight of an epoxy group-containing acrylamide monomer of Formula I and 0.005 to 5 parts by weight, preferably 0.01 to 1 part by weight of a free-radical initiator per 100 parts by weight of a polyolefin.

The method of the preparation is not restricted to particular ones and any known method may be adopted. For instance, the reaction is performed at the decomposition temperature of the free-radical initiator used while stirring the mixture of an acrylamide monomer, a radical-forming agent and a polyolefin resin in an organic solvent.

Alternatively, the reaction can also be performed by uniformly mixing these starting materials in a high-speed stirring machine and then, melting and kneading the mixture in a single screw or multi-screw extruder having a sufficient kneading ability.

The reaction temperature and time preferably range from 150° to 250° C. and 0.5 to 30 minutes respectively. It is preferred to prepare the modified polyolefin resin according to the method in which an extruder is used, from the economical standpoint.

The modified polyolefin resin of the present invention may be used in the form of a composition further containing an unmodified polyolefin resin. The content of such an unmodified polyolefin resin ranges from 0 to 95% by weight and preferably 0 to 80% by weight.

A preferred proportion of each components in the filler-reinforced polyolefin resin composition of the present invention is 3 to 300 parts by weight, preferably 5 to 200 parts by weight of a filler per 100 parts by weight of a modified polyolefin resin or a resin mixture comprising the modified polyolefin resin and an unmodified polyolefin resin. If the amount of the filler is less than the lower limit, sufficient physical properties-improving effect cannot be ensured, while if it exceeds the upper limit, coloration of the resin is caused and the impact strength of the resulting composition is lowered.

The fillers usable in the present invention include, for instance, metallic materials such as metals, e.g., iron, aluminum, copper, lead, zinc, tin and nickel and alloys mainly comprising these metals (for instance, stainless steel and brass) and a variety of metal oxides; as well as inorganic or organic materials such as glass, carbon fibers, carbon black, silicon carbide fibers, carbon whisker, asbestos, graphite, magnesium carbonate, calcium carbonate, clay, mica, talc, silica, barium sulfate, alumina, inorganic pigments, wood powder, pulp and polyester fibers.

Methods for preparing the filler-reinforced polyolefin resin composition are not restricted to specific ones and any conventionally known method can be adopted. For instance, the filler-reinforced polyolefin resin composition can be prepared by uniformly mixing a polyolefin resin, an epoxy group-containing acrylamide monomer, a free-radical initiator and a filler in a high-speed stirring machine and then, melting and kneading the mixture in a single screw or multi-screw extruder having a sufficient kneading ability.

In this respect, there may be used a method in which a polyolefin resin, an epoxy group-containing acrylamide monomer, a free-radical initiator and a filler are simultaneously melt and kneaded a method in which a filler is subsequently added to a mixture of other ingredients prepared in advance; or a method comprising coating a filler with a molten composition comprising a polyolefin resin, an epoxy group-containing acrylamide monomer and a free-radical initiator.

In the thermoplastic resin composition according to the present invention, which comprises 5 to 95 parts by weight, preferably 10 to 90 parts by weight of the modified polyolefin resin and 95 to 5 parts by weight, preferably 90 to 10 parts by weight of another thermoplastic resin, examples of said another thermoplastic resin (other than the modified polyolefins) are polyester resins, polyphenylene sulfide resins, polycarbonate resins, polyamide resins, polyacetal resins, polyphenylene oxide resins, polyallylate resins and polysulfone resins.

The polyester resins used herein are preferably polyesters having aromatic rings in the chain units thereof, which are polymers or copolymers obtained through condensation reactions of aromatic dicarboxylic acids and diols as principal components. Specific examples of such polyester resins are polyethylene terephthalate, polypropylene terephthalate, polybutylene terephthalate, polyhexamethylene terephthalate, polycyclo hexylenedimethylene terephthalate and polyethylene-2,6-naphthalate as well as polybutylene terephthalate elastomers such as "HIGHTREL" (available from Du Pont-Toray Co., Ltd.).

The polyphenylene sulfide resin (hereinafter referred to as "PPS") herein means a crosslinking type PPS which requires crosslinking after the polymerization for converting them into high molecular weight ones and a high molecular weight linear type PPS. Examples of polyphenylene sulfide resins commercially available include "RYTON P-6" (available from Phillips Petroleum Company) for the crosslinking type PPS and "FORTRON W-205" (available from Kureha Chemical Industry Co., Ltd.) for the linear type PPS's.

The polycarbonate resins are prepared by reacting divalent phenols with carbonate precursors such as phosgene, halogen formate (haloformate) or carbonate esters. Homopolymers derived from bisphenol A are preferably used.

Examples of the polyamide resins are nylon 6, nylon 66, nylon 46, nylon 11 and nylon 12 and, particularly nylon 6 and nylon 66 are preferred because of high heat resistance and good moldability thereof.

The thermoplastic resin composition containing the modified polyolefin resin according to the present invention may also be prepared by simultaneously uniformly mixing a polyolefin resin, another thermoplastic resin, an epoxy group-containing acrylamide monomer and a radical-forming agent and then melting and kneading the resulting mixture in an extruder. Moreover, the thermoplastic resin composition may further comprise, depending on purposes, reinforcing materials such as a variety of elastomers, pigments, dyes, glass fibers, metals and carbon fibers; fillers such as talc and calcium carbonate; antioxidants, UV absorbers, lubricants, flame-retardants and antistatic agents; and electrically conductive fillers such as carbon black.

The present invention will hereinafter be explained in more detail with reference to the following Examples. In the following Examples and Comparative Examples, the evaluation of physical properties were performed according to the following methods.

(1) Smell Given Out During Modification of Polyolefin Resin:

Bad Smell: A resin composition gave out a bad smell during extrusion;

Odorless: A resin composition did not give out any smell during extrusion.

(2) Izod Impact Strength
Measured in accordance with JIS-K7110.
(3) Tensile Strength and Elongation
Measured in accordance with JIS-K7113.
(4) Peel Strength
A modified polyolefin resin or a resin composition was heated and pressed on a soft aluminum plate (hereinafter referred to as "Al plate"), a steel plate or an ethylene-vinyl alcohol copolymer (hereinafter referred to as "EVOH") sheet to adhere the resin to the plate or sheet, followed by peeling off the coated film from one end of a rectangular test piece having a width of 10 mm at a measuring temperature of 23° C., a peel angle of 180°, a rate of pulling of 50 mm/min using a tensile tester to determine the interlaminar peel strength.
(5) Heat Distortion Temperature (Heat Resistance)
Measured in accordance with JIS-K7207.
Bendsing stress=4.6 Kgf/cm$^2$.
(6) Flexural Modulus
Measured in accordance with to JIS-K7113.

EXAMPLES 1 TO 4

A polypropylene resin (manufactured and sold by Mitsui Toatsu Chemicals, Inc. under the trade name of NOBLEN JS-G), N-[4-(2,3-epoxypropoxy)-3,5-dimethylbenzyl] acrylamide (available from Kanegafuchi Chemical Industry Co., Ltd.) and dicumyl peroxide were blended in the amounts listed in the following Table 1 and mixed in a Henschel mixer. Then the resulting mixtures were extruded into pellets at a melting temperature of 200° C. and the number of screw-revolutions of 100 rpm in a twin-screw extruder (having the screw diameter of 30 mm and an L/D of 30) to give modified polypropylene resins. These resins were subjected to IR spectroscopic analysis after Soxhlet extraction with chloroform. As a result, an absorption peak (1650 cm$^{-1}$) to be ascribed to the carbonyl derived from amide groups was observed. This clearly indicates that the acrylamide monomer was radical-added to the polypropylene resin.

The peel strength of the resulting modified polypropylene resins applied onto an Al plate, a steel plate and an EVOH sheet was determined. The results obtained are listed in Table 1 together with the smell observed during extrusion. The data listed in Table 1 indicate that these modified polypropylene resins did not give out any bad smell during extrusion, had sufficient peel strength and thus, had good adhesion.

COMPARATIVE EXAMPLES 1 TO 3

The same procedure as in Example 1 was repeated except that radical-forming agents or epoxy group-containing acrylamide monomers were not added. The resulting resins were subjected to IR spectroscopic analysis after Soxhlet extraction with chloroform. As a result, it was found that an absorption peak (1650 cm$^{-1}$) to be ascribed to the carbonyl derived from amide groups was disappeared. This clearly indicates that the acrylamide monomer was not radical-added to the polypropylene resin.

The peel strength of the resulting modified polypropylene resins was determined in the same manner as in Example 1. The results obtained are listed in Table 1. These modified polypropylene resins did not give out any bad smell during extrusion, but had a low peel strength and thus had insufficient adhesion.

COMPARATIVE EXAMPLE 4

The same procedures as in Example 3 was repeated except that acryl glycidyl ether (AGE) was substituted for the epoxy group-containing acrylamide monomer used therein. The results obtained are listed in Table 1. This resin gave out a bad smell during extrusion and had a low peel strength.

EXAMPLES 5 TO 8

A polyethylene resin (manufactured and sold by Mitsui Petrochemical Industries, Ltd. under the trade name of HIGHZEX 2200J), N-[4-(2,3-epoxypropoxy)-3,5-dimethylbenzyl] methacrylamide (available from Kanegafuchi Chemical Industry Co., Ltd.) and 1,3-bis-(t-butylperoxy-isopropyl)benzene were blended in the amounts listed in the following Table 2 and extruded into pellets in the same manner as in Example 1 to give modified polyethylene resins. The results of the IR spectroscopic analysis indicate that the methacrylamide monomer was radical-added to the polyethylene resin.

The peel strength of the resulting modified polyethylene resins applied onto an Al plate, a steel plate and an EVOH sheet was determined. The results obtained are listed in Table 2. These modified polyethylene resins did not give out any bad smell during extrusion and had a good peel strength.

COMPARATIVE EXAMPLES 5 TO 7

The same procedures as in Example 5 was repeated except that free-radical initiators or epoxy group-containing acrylamide monomers were not added. These resins were subjected to IR spectroscopic analysis after Soxhlet extraction with chloroform. As a result, it was found that the epoxy group-containing acrylamide monomer was not radical-added to the polyethylene resin.

The peel strength of the resulting modified polyethylene resins was determined in the same manner as in Example 1. The results obtained are listed in Table 2 together with the smells observed during extrusion thereof. These modified polyethylene resins did not give out any bad smell during extrusion, but had a low peel strengths.

COMPARATIVE EXAMPLE 8

The same procedure as in Example 7 was repeated except that glycidyl methacrylate (GMA) was substituted for the epoxy group-containing acrylamide monomer. The results obtained are listed in Table 2. This resin gave out a bad smell during extrusion and had a low peel strength.

EXAMPLES 9 TO 12

A polypropylene resin (manufactured and sold by Mitsui Toatsu Chemicals, Inc. under the trade name of MITSUI NOBLEN JS-G), N-[4-(2,3-epoxypropoxy)-3,5-dimethylbenzyl] acrylamide (available from Kanegafuchi Chemical Industry Co., Ltd.) as a acrylmide monomer, dicumyl peroxide as a free-radical initiator and glass chopped strands having length of 3 mm were charged and mixed in a tumbling mixer in the amounts listed in the following Table 3. Then the resulting mixture was extruded into pellets at a melting temperature of 240° C. and the number of screw-revolutions of 100 rpm in a twin-screw extruder (having a screw diameter of 30 mm and an L/D of 30). The pellets of these resins were injection-molded into test pieces and physical properties thereof were determined. The results obtained are listed in Table 3.

COMPARATIVE EXAMPLES 9 TO 11

The same procedures as in Example 9 was repeated except that the amounts of the acrylamide monomers or free-radical initiators were outside the range defined according to the present invention. The results obtained are summarized in Table 3. These resins had a low heat resistance or mechanical strength.

COMPARATIVE EXAMPLE 12

The same procedure as in Example 11 was repeated except that maleic anhydride (MAH) was substituted for the acrylamide monomer. The results obtained are summarized in Table 3. The resulting resin was inferior in physical properties to the resin obtained through the use of the acrylamide monomer and gave out a bad smell during extrusion.

EXAMPLES 13 TO 16

A polyethylene terephthalate (manufactured and sold by Mitsui Pet Resin Co., Ltd. under the trade name of J 025) as a polyester resin, ethylene-propylene-dicyclopentadiene elastomer resin (manufactured and sold by Japan Synthetic Rubber Co., Ltd. under the trade name of EP 86) as a polyolefin resin, N-[4-(2,3-epoxypropoxy)-3,5-dimethylbenzyl] acrylamide as an acrylmide monomer and dicumyl peroxide as a free-radical initiator were charged and mixed in a Henschel mixer in amounts listed in the following Table 4. Then the resulting mixture was extruded into pellets at a melting temperature of 260° C. and the number of screw-revolutions of 100 rpm in a twin-screw extruder (having a screw diameter of 30 mm and an L/D of 30). The pellets of these resins were injection-molded into test pieces and physical properties thereof were determined. The results obtained are listed in Table 4. The resulting resins had physical properties in which impact resistance, rigidity and heat resistance were well-balanced.

COMPARATIVE EXAMPLES 13 TO 15

The same procedures as in Example 13 was repeated except that the amounts of each starting material were changed to those listed in Table 2. The results obtained are summarized in Table 4. The resulting resins had insufficient balance between impact resistance, rigidity and heat resistance and were impracticable.

EXAMPLES 17 TO 22

A polybutylene terephthalate (manufactured and sold by Teijin Co., Ltd. under the trade name of TRB-H) and a polybutylene terephthalate elastomer (manufactured and sold by Du Pont-Toray Co., Ltd. under the trade name of HIGHTREL 5557 ) as polyester resins, propylene-ethylene block copolymer resin (manufactured and sold by Mitsui Toatsu Chemicals, Inc. under the trade name of MITSUI NOBLEN BJS-G) as a polyolefin resin, N-[4-(2,3-epoxypropoxy)-3-methylbenzyl] acrylamide (available from Kanegafuchi Chemical Industry Co., Ltd.) as an epoxy group-containing acrylmide monomer and 1,3-bis-(t-butylperoxy-isopropyl)-benzene as a free-radical initiator charged and mixed and then the resulting mixture was extruded into pellets at a melting temperature of 250° C. and the number of screw-revolutions of 100 rpm in a twin-screw extruder (having a screw diameter of 30 mm and an L/D of 30). The pellets of these resins were injection-molded into test pieces and physical properties thereof were determined. The results obtained are listed in Table 5.

COMPARATIVE EXAMPLES 16 TO 19

The same procedures as in Example 17 was repeated except that the amounts of each starting material were changed to those listed in Table 3. The results obtained are summarized in Table 5. The resulting resins had insufficient balance between impact resistance, rigidity and heat resistance and were impracticable.

EXAMPLES 23 TO 25

A polypropylene resin (manufactured and sold by Mitsui Toatsu Chemicals, Inc. under the trade name of MITSUI NOBLEN JS-G; 100 parts by weight), N-[4-(2,3-epoxypropoxy)-3,5-dimethylbenzyl] acrylamide (available from Kanegafuchi Chemical Industry Co., Ltd.; 1 part by weight) and dicumyl peroxide (0.1 part by weight) were mixed in a Henschel mixer and then the resulting mixture was extruded into pellets at a melting temperature of 200° C. and the number of screw-revolutions of 100 rpm in a twin-screw extruder (having a screw diameter of 30 mm and an L/D of 30) to give modified polypropylene resins. The modified polypropylene resin, the foregoing polypropylene resin and a polybutylene terephthalate (manufactured and sold by Teijin Chemical Industry Co., Ltd. under the trade name of TRB-H) were mixed in a ratio shown in Table 6 and extruded into pellets in the foregoing twin-screw extruder at a melting temperature of 250° C. and the number of screw-revolutions of 100 rpm. The pellets of these resins were injection-molded into test pieces and physical properties thereof were determined in the foregoing manner. The results obtained are listed in Table 6. All of these resins had sufficient mechanical properties practically acceptable.

COMPARATIVE EXAMPLES 20 TO 22

The same procedure as in Example 23 was repeated except that the modified polypropylene resin was not used and physical properties of the resulting resins were determined according to the same method. The results obtained are listed in Table 6. The resulting resins had low mechanical properties practically unacceptable.

EXAMPLES 26 TO 28

A polyethylene resin (manufactured and sold by Mitsui Petrochemical Industries, Ltd. under the trade name of MITSUI HIGHZEX 2200J; 100 parts by weight), N-[4-(2,3-epoxypropoxy)-3,5-dimethylbenzyl] methacrylamide (available from Kanegafuchi Chemical Industry Co., Ltd.; 1 part by weight) and 1,3-bis-(t-butylperoxy-isopropyl) benzene (0.3 part by weight) were mixed in a Henschel mixer and then extruded into pellets at a melting temperature of 200° C. and the number of screw-revolutions of 100 rpm in a twin-screw extruder (having a screw diameter of 30 mm and an L/D of 30) to give modified polyethylene resins. The modified polyethylene resin, the foregoing polyethylene resin and polycarbonate resin (manufactured and sold by Teijin Co., Ltd. under the trade name of PANLITE L-1225) were mixed in ratios shown in Table 7 and extruded into pellets in the foregoing twin-screw extruder at the melting temperature of 250° C. and the number of screw-revolutions of 100 rpm. The pellets of these resins were injection-molded into test pieces and physical properties thereof were determined in the foregoing manner. The results obtained are listed in Table 7, All of these resins had sufficient mechanical properties practically acceptable

COMPARATIVE EXAMPLES 23 TO 25

The same procedures as in Example 26 was repeated except that the modified polyethylene resin was not used and physical properties of the resulting resins were determined according to the same method, The results obtained are listed in Table 7, The resulting resins had low mechanical properties practically unacceptable.

EXAMPLES 29 TO 31

A propylene-ethylene block copolymer resin (manufactured and sold by Mitsui Toatsu Chemicals, Inc. under the trade name of MITSUI NOBLEN BEB-G; 100 parts by weight), N-[4-(2,3-epoxypropoxy)-3-methylbenzyl] acrylamide (available from Kanegafuchi Chemical Industry Co., Ltd.; 3 parts by weight) and dicumyl peroxide (2 parts by weight) were mixed in a Henschel mixer and then extruded into pellets at a melting temperature of 210° C. and the number of screw-revolutions of 100 rpm in a twin-screw extruder (having a screw diameter of 30 mm and an L/D of 30) to give modified propylene-ethylene block copolymer resin, The modified propylene-ethylene block copolymer resins and a polyphenylene sulfide resin (manufactured and sold by Kureha Chemical Industry Co., Ltd. under the trade name of FORTRON W-205) were mixed in ratios shown in Table 8 and extruded into pellets in the foregoing twin-screw extruder at a melting temperature of 310° C. and the number of screw-revolutions of 100 rpm. The pellets of these resins were injection-molded into test pieces and physical properties thereof were determined in the foregoing manner. The results obtained are listed in Table 8. All of these resins had sufficient mechanical properties practically acceptable.

COMPARATIVE EXAMPLES 26 TO 28

The same procedure as in Example 29 was repeated except that the modified propylene-ethylene block copolymer resin was not used and physical properties of the resulting resins were determined according to the same method. The results obtained are listed in Table 8. The resulting resins had substantially low mechanical properties practically unacceptable.

EXAMPLES 32 TO 34

A polypropylene as (MITSUI NOBLEN BJH-G, available from Mitsui Toatsu Chemicals, Inc.; 100 parts by weight), N-[4-(2,3-epoxypropoxy)-3,5-dimethylbenzyl] acrylamide (available from Kanegafuchi Chemical Industry Co., Ltd.; 1 part by weight) and dicumyl peroxide (0.1 part by weight) were mixed in a Henschel mixer and then extruded into pellets at a melting temperature of 200° C. and the number of screw-revolutions of 100 rpm in a twin-screw extruder (having a screw diameter of 30 mm and an L/D of 30) to give modified polypropylene resins. The modified polypropylene resins, the foregoing polypropylene resin and a nylon 9 resin (manufactured and sold by Toyoho Co., Ltd. under the trade name of T-802) were mixed in rates listed in Table 6 and extruded into pellets in the foregoing twin-screw extruder at a melting temperature of 250° C. and the number of screw-revolutions of 100 rpm. The pellets of these resins were injection-molded into test pieces and physical properties thereof were determined in the foregoing manner. The results obtained are listed in Table 9. All of these resins had sufficient mechanical properties practically acceptable.

COMPARATIVE EXAMPLES 29 TO 31

The same procedure as in Example 32 was repeated except that the modified polypropylene resin was not used and physical properties of the resulting resins were determined according to the same method. The results obtained are listed in Table 9. The resulting resins had very low mechanical properties practically unacceptable.

EXAMPLES 35 TO 37

A polypropylene resin (MITSUI NOBLEN JH-G, available from Mitsui Toatsu Chemicals, Inc.; 100 parts by weight), N-[4-(2,3-epoxypropoxy)-3,5-dimethylbenzyl] acrylamide (available from Kanegafuchi Chemical Industry Co., Ltd.; 2 parts by weight) and dicumyl peroxide (0.3 part by weight) were mixed in a Henschel mixer and then, modified polypropylene resins were prepared in the same manner as in Example 32. The modified polypropylene resins, the foregoing polypropylene resin and a polybutylene terephthalate resin (manufactured and sold by Teijin Ltd. under the trade name of TRB-H) and glass chopped strands having length of 3 mm in amounts shown in Table 10 were mixed and extruded into pellets in a twin-screw extruder at the melting temperature of 260° C. and the number of screw-revolutions of 100 rpm. The pellets were injection-molded into test pieces and physical properties thereof were determined in the foregoing manner. The results obtained are listed in Table 10. All of these composite materials had sufficient mechanical properties practically acceptable.

COMPARATIVE EXAMPLES 32 TO 34

The same procedure as in Example 35 was repeated except that the modified polypropylene resin was not used and physical properties of the resulting composition were determined according to the same method. The results obtained are listed in Table 10. The resulting composition had very low mechanical properties practically unacceptable.

EXAMPLE 38

A polypropylene resin (the same resin as in Example 1; 100 parts by weight), N-[4-(2,3-epoxypropoxy)-3,5-dimethylbenzyl] acrylamide (1 part by weight) and dicumyl peroxide (0.05 part by weight) were dry-blended in a Henschel mixer and treated in the same manner as in Example 23 to give a modified polypropylene resin.

The epoxy group content and reaction amount rate of the modifying agent which reacted with the polypropylene resin (the rate of reaction, given in Table 11) were determined as follows.

The reaction mass was subjected to Soxhlet extraction with chloroform for 20 hours and then washed to remove the unreacted epoxy group-containing acrylamide monomer, the oligomers thereof, the radical-forming agent and the decomposition products thereof remaining after the reaction. The epoxy group content (equivalent/g) was determined on the basis of the IR spectrum ascribed to the epoxy groups of the modified polyolefin resin from which unreacted products had been removed and further, percentage in amount of the practically reacted modifying agent among the initially added modifying agent was calculated according to the following equation in terms of a rate of reaction (%):

$$\text{Rate of Reaction } 100 = \frac{\text{Epoxy Group Content}}{\text{Equivalent of Added Epoxy Monomers}} \times$$

To the modified polypropylene resin obtained above (100 parts by weight), there was added 30 parts by weight of glass chopped strands having length of 3 mm, the mixture was blended in a tumbling mixer and then extruded into pellets in the same manner as in Example 9. These pellets were injection-molded into test pieces and physical properties thereof were determined. The results obtained are summarized in Table 11. In addition, 70% by weight of the modified polypropylene resin and 30% by weight of a polybutylene terephthalate (TRB-J, available from Teijin Ltd.) were mixed and then physical properties were determined in the same manner as in Example 23. The results obtained are listed in Table 11.

COMPARATIVE EXAMPLE 35

The same procedure as in Example 38 was repeated to give a modified polypropylene resin except that glycidyl methacrylate (GMA) was substituted for the N-[4-(2,3-epoxypropoxy)-3,5-dimethylbenzyl] acrylamide in an amount of three times that of the latter in order to control the epoxy group content after modification to that observed in Example 38. This modified polypropylene resin was treated in the same manner as in Example 38 to give test pieces and physical properties thereof were determined. The results obtained are listed in Table 11.

COMPARATIVE EXAMPLE 36

The same procedure as in Example 38 was repeated except that any modifying agent was not used and physical proeprties were determined. The results thus obtained are summarized in Table 11.

The data listed in Table 11 indicates that the modified polypropylene resin of Comparative Example 33 gives out a bad smell during extrusion, the adhesion strength thereof was reduced and mechanical properties were low, even when GMA was substituted for the modifying agent used in the present invention in an amount of three times that of the latter in order to equalize the epoxy group contents after modification.

TABLE 1

| Composition | | Example 1 | Example 2 | Example 3 | Example 4 | Comp. Example 1 | Comp. Example 2 | Comp. Example 3 | Comp. Example 4 |
|---|---|---|---|---|---|---|---|---|---|
| Polyolefin Resin <Polypropylene> | (part by weight) | 100 | 100 | 100 | 100 | 100 | 100 | 100 | 100 |
| Epoxy Group-Containing Acrylamide Monomer | (part by weight) | 0.5 | 10 | 5 | 5 | 0 | 10 | 0 | AGE 5 |
| Free-Radical Initiator | (part by weight) | 0.5 | 0.7 | 0.01 | 4 | 1 | 0 | 0 | 0.01 |
| Smell During Extrusion | | odorless | odorless | odorless | odorless | odorless | odorless | odorless | bad smell |
| Peel Strength (kg/10 mm) | | | | | | | | | |
| A 1 Plate | | 15 | 17 | 11 | 11 | 4.8 | 6.0 | 2.7 | 7.3 |
| Steel Plate | | 11 | 12 | 9.8 | 9.5 | 3.7 | 4.1 | 2.4 | 5.9 |
| EVOH | | 11 | 13 | 10 | 10 | 2.1 | 4.3 | <1 | 5.1 |

TABLE 2

| Composition | | Example 5 | Example 6 | Example 7 | Example 8 | Comp. Example 5 | Comp. Example 6 | Comp. Example 7 | Comp. Example 8 |
|---|---|---|---|---|---|---|---|---|---|
| Polyolefin Resin <Polyethylene> | (part by weight) | 100 | 100 | 100 | 100 | 100 | 100 | 100 | 100 |
| Epoxy Group-Containing Acrylamide Monomer | (part by weight) | 0.5 | 10 | 5 | 5 | 0 | 10 | 0 | GMA 5 |
| Free-Radical Initiator | (part by weight) | 0.5 | 0.7 | 0.01 | 4 | 1 | 0 | 0 | 0.01 |
| Smell During Extrusion | | odorless | odorless | odorless | odorless | odorless | odorless | odorless | bad smell |
| peel Strength (kg/10 mm) | | | | | | | | | |
| A 1 Plate | | 14 | 18 | 14 | 10 | 4.2 | 5.8 | 2.3 | 6.2 |
| Steel Plate | | 9.5 | 10 | 9.1 | 9.3 | 3.5 | 3.7 | 3.3 | 5.2 |
| EVOH | | 12 | 14 | 10 | 11 | 4.4 | 5.1 | 2.2 | 6.8 |

TABLE 3

| Composition | | Example 9 | Example 10 | Example 11 | Example 12 | Comp. Example 9 | Comp. Example 10 | Comp. Example 11 | Comp. Example 12 |
|---|---|---|---|---|---|---|---|---|---|
| Polyolefin Resin <Polypropylene> | (part by weight) | 100 | 100 | 100 | 100 | 100 | 100 | 100 | 100 |
| Epoxy Group-Containing Acrylamide Monomer | (part by weight) | 0.5 | 10 | 1 | 5 | 0 | 10 | 0 | MAH 1 |
| Free-Radical Initiator | (part by weight) | 0.5 | 0.7 | 0.05 | 4 | 1 | 0 | 0 | 0.05 |
| Glass Fiber | (part by weight) | 5 | 3 | 30 | 100 | 20 | 50 | 50 | 30 |
| Smell During Extrusion | | odorless | odorless | odorless | odorless | odorless | odorless | odorless | bad smell |
| Izod Impact Strength | (kg · cm/cm) | 12 | 16 | 14 | 13 | 4.0 | 5.2 | 6.1 | 7.0 |
| Tensile Strength | (kg/cm$^2$) | 720 | 730 | 740 | 700 | 310 | 420 | 370 | 520 |
| Heat Distortion Temp. | (°C.) | 135 | 144 | 148 | 148 | 98 | 106 | 108 | 112 |

TABLE 4

| Composition | | Example | | | | Comp. Example | | |
|---|---|---|---|---|---|---|---|---|
| | | 13 | 14 | 15 | 16 | 13 | 14 | 15 |
| Polyethylene Terephthalate | (% by weight) | 40 | 50 | 80 | 90 | 5 | 95 | 80 |
| Ethylene-Propylene-Dicyclo-pentadiene Elastomer | (% by weight) | 60 | 50 | 20 | 10 | 95 | 5 | 20 |
| N-[4-(2,3-epoxypropoxy)-3,5-dimethylbenzyl] acrylamide | (part by weight) | 5 | 3 | 3 | 1 | 3 | 3 | 0.05 |
| Free-Radical Initiator | (part by weight) | 0.1 | 0.1 | 0.1 | 0.1 | 0.1 | 0.1 | 0.1 |
| Izod Impact Strength | (kg · cm/cm) | 65 | 45 | 30 | 25 | 65 | 8 | 9 |
| Flexural | (kg/cm$^2$) | 11000 | 13500 | 17500 | 19000 | 3500 | 23000 | 16500 |
| Heat Distortion Temp. | (°C.) | 100 | 115 | 135 | 157 | 112 | 102 | 130 |

TABLE 5

| Compositipon | | Example | | | | | | Comp. Example | | | |
|---|---|---|---|---|---|---|---|---|---|---|---|
| | | 17 | 18 | 19 | 20 | 21 | 22 | 16 | 17 | 18 | 19 |
| Polybutylene Terephthalate (% by weight) | | 0 | 0 | 15 | 30 | 50 | 70 | 0 | 0 | 30 | 30 |
| Polybutylene Terephthalate Elastomer (% by weight) | | 10 | 20 | 15 | 20 | 10 | 20 | 5 | 95 | 20 | 20 |
| Propylene-Ethylene-Block Copolymer Resin (% by weight) | | 90 | 80 | 70 | 50 | 40 | 10 | 95 | 5 | 50 | 50 |
| N-[4-(2,3-epoxypropoxy)-3-methylbenzyl] acrylamide (part by weight) | | 8 | 5 | 2 | 2 | 2 | 0.5 | 2 | 2 | 15 | 2 |
| Free-Radical Initiator (part by weight) | | 0.2 | 0.2 | 0.2 | 0.2 | 0.2 | 0.2 | 0.2 | 0.2 | 0.2 | 15 |
| Izod Impact Strength | (kg · cm/cm) | 55 | 65 | 45 | 63 | 25 | 35 | 7 | 68 | | 8 |
| Flexural | (kg/cm$^2$) | 15000 | 12000 | 13500 | 15500 | 16500 | 17000 | 15500 | 4000 | yellowing | 12500 |
| Heat Distortion Temp. | (°C.) | 112 | 100 | 108 | 115 | 120 | 135 | 112 | 65 | | 100 |

TABLE 6

| Composition | Example | | | Comp. Example | | |
|---|---|---|---|---|---|---|
| | 23 | 24 | 25 | 20 | 21 | 22 |
| Modified Polypropylene Resin (% by weight) | 15 | 20 | 75 | | | |
| Polypropylene Resin (% by weight) | 10 | 30 | 10 | 25 | 50 | 85 |
| Polybuthylene Terephthalate Resin (% by weight) | 75 | 50 | 15 | 75 | 50 | 15 |
| Izod Impact Strength (kg · cm/cm) | 7 | 7 | 10 | 3 | 2 | 4 |
| Tensile Strength (kg/cm$^2$) | 450 | 410 | 350 | 420 | 370 | 310 |
| Elongation (%) | 40 | 125 | 220 | 12 | 15 | 16 |

TABLE 7

| Composition | Example | | | Comp. Example | | |
|---|---|---|---|---|---|---|
| | 26 | 27 | 28 | 23 | 24 | 25 |
| Modified Polyethylene Resin (% by weight) | 15 | 20 | 45 | | | |
| Polyethylene Resin (% by weight) | 10 | 30 | 40 | 15 | 50 | 85 |
| Polycarbonate Resin (% by weight) | 75 | 50 | 15 | 85 | 50 | 15 |
| Izod Impact Strength (kg · cm/cm) | 30 | 22 | 25 | 15 | 10 | 12 |
| Tensile Strength (kg/cm$^2$) | 430 | 350 | 300 | 380 | 280 | 250 |
| Elongation (%) | 15 | 75 | 150 | 4 | 15 | 30 |

TABLE 8

| Composition | Example | | | Comp. Example | | |
|---|---|---|---|---|---|---|
| | 29 | 30 | 31 | 26 | 27 | 28 |
| Ethylene-Propylene Block Copolymer Resin (% by weight) | | | | 15 | 50 | 85 |
| Modified Ethylene-Propylene Block Copolymer Resin (% by weight) | 15 | 50 | 85 | | | |
| Polyphenylene Sulfide Resin (% by weight) | 85 | 50 | 15 | 85 | 50 | 15 |
| Izod Impact Strength (kg · cm/cm) | 6 | 7 | 15 | 2 | 3 | 4 |
| Tensile Strength (kg/cm$^2$) | 750 | 510 | 390 | 730 | 470 | 320 |
| Elongation (%) | 20 | 35 | 150 | 3 | 5 | 8 |

TABLE 9

| Composition | Example | | | Comp. Example | | |
|---|---|---|---|---|---|---|
| | 32 | 33 | 34 | 29 | 30 | 31 |
| Modified Polypropylene Resin (% by weight) | 10 | 25 | 50 | | | |
| Polypropylene Resin (% by weight) | 15 | 25 | 35 | 25 | 50 | 85 |
| Polyamide Resin (% by weight) | 75 | 50 | 15 | 75 | 50 | 15 |
| Izod Impact Strength (kg · cm/cm) | 19 | 8 | 12 | 3 | 3 | 5 |
| Tensile Strength (kg/cm$^2$) | 430 | 380 | 310 | 400 | 350 | 300 |
| Elongation (%) | 25 | 75 | 130 | 7 | 8 | 8 |

TABLE 10

| Composition | Example | | | Comp. Example | | |
|---|---|---|---|---|---|---|
| | 35 | 36 | 37 | 32 | 33 | 34 |
| Modified Polypropylene | 15 | 20 | 75 | | | |

TABLE 10-continued

| Composition | Example | | | Comp. Example | | |
|---|---|---|---|---|---|---|
| | 35 | 36 | 37 | 32 | 33 | 34 |
| Resin (% by weight) | | | | | | |
| Polypropylene Resin (% by weight) | 10 | 30 | 10 | 25 | 50 | 85 |
| Polybutylene Terephthalate Resin (% by weight) | 75 | 50 | 15 | 75 | 50 | 15 |
| Glass Fiber (part by weight per 100 parts by weight of the foregoing resins) | 5 | 30 | 100 | 5 | 30 | 100 |
| Izod Impact Strength (kg · cm/cm) | 8 | 6 | 11 | 4 | 3 | 3 |
| Tensile Strength (kg/cm²) | 500 | 650 | 780 | 410 | 500 | 410 |
| Elongation (%) | 11 | 8 | 7 | 62 | 3 | 4 |

TABLE 11

| | Modifying Agent | Epoxy Group Content of Modifying Agent Reacted with Polypropylene Resin | | Peel Strength with Respect to Al Plate kg/ 10 mm | Physical Properties Upon Addition of 30 parts of Glass Chopped Strand | | Physical Properties Upon Addition of 30% by Weight of Polybutylene Terephthalate | | | Smell During Extrusion |
|---|---|---|---|---|---|---|---|---|---|---|
| | Monomer | Added Amount | Equivalent/g | Rate of Reaction % | | Tensile Strength kg/cm² | Heat Distortion Temp. | Izod Impact Strength kg cm/cm | Tensile Strength kg/cm² | Elongation % | |
| Ex. 38 | N-[4-(2,3-epoxypropoxy)-3,5-dimethyl-benzyl] acryamide | 1 | 1.88 × 10⁻⁵ | 49.6 | 11 | 750 | 142 | 9 | 370 | 260 | odorless |
| Comp. Ex. 35 | Glycidyl Methacrylate (GMA) | 3 | 1.88 × 10⁻⁵ | 8.8 | 5.8 | 500 | 109 | 6 | 330 | 20 | bad less |
| Comp. Ex. 36 | None | — | — | — | 3.1 | 3 | 98 | 4 | 320 | 16 | odorless |

INDUSTRIAL APPLICABILITY

The modified polyolefin resin composition according to the present invention does not give out any bad smell during modification, is excellent in adhesion to inorganic fillers, metals and polymeric resin substrates and, good mechanical properties such as Izod impact strength, tensile strength and elongation. Therefore, the resin composition can be used in the fields of automobiles, appliances and industrial parts and has enough practical value.

We claim:

1. A modified polyolefin resin obtained by reacting a polyolefin resin with an epoxy group-containing acrylamide monomer represented by the following general formula I:

$$H_2C=CR-CO-NH-CH_2-Ar \quad I$$

wherein Ar represents an aromatic hydrocarbon group having 6 to 24 carbon atoms which is substituted with at least one glycidyloxy group and R represents a hydrogen atom or a methyl group in the presence of a free-radical initiator.

2. The modified polyolefin resin of claim 1 wherein it comprises further containing 0 to 95% by weight of an unmodified polyolefin resin.

3. The modified polyolefin resin of claim 1 wherein the polyolefin resin is selected from polypropylene, polyethylene, propylene-ethylene block or random copolymers, ethylene-propylene elastomer, ethylene-propylene-diene elastomer, ethylene-propylene dicyclopentadiene copolymer, ethylene-propylene ethylidene norbornene copolymer and poly(4-methyl-pentene-1).

4. The modified polyolefin resin of claim 1 wherein the epoxy group-containing acrylamide monomer is selected from N-[4-(2,3-epoxypropoxy)-3,5-dimethylbenzyl] acrylamide, N-[4-(2,3-epoxypropoxy)-3,5-dimethylbenzyl] methacrylamide and N-[4-(2,3-epoxypropoxy)-3-methylbenzyl] acrylamide.

5. A method for preparing a modified polyolefin resin comprising reacting a polyolefin resin with an epoxy group-containing acrylamide monomer represented by the following general formula I:

$$H_2C=CR-CO-NH-CH_2-Ar \quad (I)$$

wherein Ar represents an aromatic hydrocarbon group having 6 to 24 carbon atoms which is substituted with at least one glycidyloxy group and R represents a hydrogen atom or a methyl group in the presence of a free-radical initiator in an extruder.

6. The method of claim 5 wherein 100 parts by weight of the polyolefin resin, 0.01 to 20 parts by weight of the epoxy group-containing acrylamide monomer represented by the above general formula I and 0.005 to 5 parts by weight of the free-radical initiator are used.

7. The method of claim 5 wherein the reaction temperature ranges from 150° to 250° C.

8. A thermoplastic resin composition comprising 5 to 95% by weight of a modified polyolefin resin obtained by reacting a polyolefin resin with an epoxy group-containing acrylamide monomer represented by general formula I:

$$H_2C=CR-CO-NH-CH_2-Ar \quad (I)$$

wherein Ar represents an aromatic hydrocarbon group having 6 to 24 carbon atoms which is substituted with at least one glycidyloxy group and R represents a hydrogen atom or a methyl group in the presence of a free-radical initiator and 95 to 5% by weight of another thermoplastic resin.

9. The thermoplastic resin composition of claim 8 wherein said another thermoplastic resin is selected from polyester resins, polyphenylene sulfide resins, polycarbonate resins, polyamide resins, polyacetal resins, polyphenylene oxide resins, polyallylate resins and polysulfone resins.

10. A filler-reinforced polyolefin resin composition comprising 100 parts by weight of a modified polyolefin resin obtained by reacting a polyolefin resin with an epoxy group-containing acrylamide monomer represented by general formula I:

$$H_2C=CR-CO-NH-CH_2-Ar \qquad (I)$$

wherein Ar represents an aromatic hydrocarbon group having 6 to 24 carbon atoms which is substituted with at least one glycidyloxy group and R represents a hydrogen atom or a methyl group in the presence of a free-radical initiator and 3 to 300 parts by weight of a filler.

11. A modified polyolefin resin composition obtained by melting and kneading (A) 10 to 90% by weight of a polyolefin resin, (B) 90 to 10% by weight of another thermoplastic resin; and 0.01 to 20 parts by weight of an epoxy group-containing acrylamide monomer represented by general formula I:

$$H_2C=CR-CO-NH-CH_2-Ar \qquad (I)$$

wherein Ar represents an aromatic hydrocarbon group having 6 to 24 carbon atoms which is substituted with at least one glycidyloxy group and R represents a hydrogen atom or a methyl group and 0.005 to 5 parts by weight of a free-radical initiator, respectively per 100 parts by weight of the sum of the above components (A) and (B).

12. A filler-reinforced polyolefin resin composition obtained by melting and kneading 100 parts by weight of a polyolefin resin, 0.01 to 20 parts by weight of an epoxy group-containing acrylamide monomer represented by general formula I:

$$H_2C=CR-CO-NH-CH_2-Ar \qquad (I)$$

wherein Ar represents an aromatic hydrocarbon group having 6 to 24 carbon atoms which is substituted with at least one glycidyloxy group and R represents a hydrogen atom or a methyl group 0.005 to 5 parts by weight of a free-radical initiator and 3 to 300 parts by weight of a filler.

* * * * *